US007764185B1

(12) United States Patent
Manz et al.

(10) Patent No.: US 7,764,185 B1
(45) Date of Patent: *Jul. 27, 2010

(54) SYSTEM, USER WARNING AND POSITIONING DEVICE FOR USE THEREIN, AND COMPUTER PROGRAM PRODUCT THEREFOR, FOR TACTICAL DISTRIBUTED EVENT WARNING NOTIFICATION FOR INDIVIDUAL ENTITIES

(75) Inventors: Paul C. Manz, Matawan, NJ (US); Fernando J. Maymi, West Point, NY (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/489,808

(22) Filed: Jul. 19, 2006

Related U.S. Application Data

(60) Provisional application No. 60/764,384, filed on Jan. 26, 2006.

(51) Int. Cl.
*G08B 19/00* (2006.01)
(52) U.S. Cl. .................. 340/601; 340/506; 340/539; 340/3.1; 340/825.36; 340/825.49
(58) Field of Classification Search .............. 340/601; 702/3, 188; 713/300; 455/426.1; 700/90; 717/106; 342/45; 709/248
See application file for complete search history.

(56) References Cited

U.S. PATENT DOCUMENTS

| | | | | |
|---|---|---|---|---|
| 5,287,511 A | * | 2/1994 | Robinson et al. ............ 717/106 |
| 5,864,481 A | * | 1/1999 | Gross et al. .................... 700/90 |
| 5,974,238 A | * | 10/1999 | Chase, Jr. .................... 709/248 |
| 6,018,770 A | | 1/2000 | Little et al. .................. 709/223 |
| 6,028,514 A | | 2/2000 | Lemelson et al. |
| 6,084,510 A | | 7/2000 | Lemelson et al. |
| 6,201,495 B1 | * | 3/2001 | Lemelson et al. ............. 342/45 |
| 6,832,251 B1 | | 12/2004 | Gelvin et al. |
| 2001/0027389 A1 | | 10/2001 | Beverina et al. |
| 2001/0051996 A1 | | 12/2001 | Cooper et al. |
| 2003/0067542 A1 | | 4/2003 | Monroe |
| 2003/0074672 A1 | | 4/2003 | Daniels ....................... 725/110 |
| 2003/0171939 A1 | | 9/2003 | Yagesh et al. |
| 2003/0204748 A1 | | 10/2003 | Chiu |
| 2004/0070515 A1 | | 4/2004 | Burkley et al. |

(Continued)

*Primary Examiner*—Dang T Ton
*Assistant Examiner*—Lionel Preval
(74) *Attorney, Agent, or Firm*—Michael Zelenka; Stephen J. Harbulak

(57) ABSTRACT

A system, device, and computer program product is provided for the centralized or distributed warning of existing or developing significant events and/or threats to users of the device within their locale, while reporting the location of all users of the system to existing command and control systems. A pager-like user warning and positioning device, worn by or carried by the individual user, or mounted in a vehicle or vessel, having a geographical positioning means therein, periodically transmits the geographical location of the individual user, vehicle or vessel, and listens for warning/notification event messages transmitted by a network bridge or central station. When an event/threat warning is received by the device, the device alerts the user via indicia relative to the event/situation, including audible spoken warnings and instructions on how to react, and may retransmit the event/threat warning to other nodes in the network.

9 Claims, 2 Drawing Sheets

U.S. PATENT DOCUMENTS

| | | |
|---|---|---|
| 2004/0100379 A1 | 5/2004 | Boman et al. |
| 2004/0198254 A1 | 10/2004 | Mizui et al. |
| 2004/0252049 A1 | 12/2004 | Vantalon et al. |
| 2005/0003812 A1* | 1/2005 | Gladwin et al. ........... 455/426.1 |
| 2005/0078647 A1 | 4/2005 | Meier et al. .................. 370/338 |
| 2005/0108582 A1* | 5/2005 | Fung ........................... 713/300 |
| 2005/0143013 A1 | 6/2005 | Jha et al. |
| 2005/0197775 A1* | 9/2005 | Smith ............................ 702/3 |
| 2005/0219044 A1 | 10/2005 | Douglass et al. ............ 340/506 |
| 2005/0240378 A1* | 10/2005 | Smith et al. .................. 702/188 |
| 2005/0243867 A1 | 11/2005 | Petite |
| 2005/0272368 A1 | 12/2005 | Langsenkamp et al. |
| 2006/0141940 A1 | 6/2006 | Bloom et al. .................. 455/73 |
| 2006/0168592 A1 | 7/2006 | Andrews et al. ............. 719/318 |
| 2006/0187017 A1 | 8/2006 | Kulesz et al. ................ 340/506 |
| 2007/0115116 A1 | 5/2007 | Zabek ................... 340/539.22 |

* cited by examiner

SYSTEM, USER WARNING AND POSITIONING DEVICE FOR USE THEREIN, AND COMPUTER PROGRAM PRODUCT THEREFOR, FOR TACTICAL DISTRIBUTED EVENT WARNING NOTIFICATION FOR INDIVIDUAL ENTITIES

CROSS REFERENCE TO RELATED APPLICATION

This application claims the benefit of U.S. Provisional Patent Application Ser. No. 60/764,384, entitled "System for Event Warning/Notification and Reporting for Individual Entities" and filed Jan. 26, 2006, which is fully incorporated herein by reference herein.

STATEMENT OF GOVERNMENT INTEREST

The invention described herein may be manufactured, used, imported, sold, and licensed by or for the Government of the United States of America without the payment or any royalty thereon or therefor.

FIELD OF THE INVENTION

The present invention relates to the field of communications notification and warning systems, and more particularly, to a network information system that combines hardware components and a corresponding computer software system to provide a distributed system for real-time event warning/notification to numerous individual entities across dispersed locations via one or more central event/threat receiving stations, one or more network bridges, and one or more user warning and positioning devices. Further, a user warning and positioning device for operation within the above system is provided, which allows the tracking and warning of users of the system.

BACKGROUND OF THE INVENTION

One of the salient features of today's modern organizations on a global, national, regional and local level is the ability to leverage information technology to command and control systems in real or near-real time. Advances in the technologies that integrate sensor and communications systems, for instance, facilitate determination of the precise location of mobile vehicles. Also, a plurality of modern information systems permit such location determination, including space, airborne, terrestrial and marine-based command and control systems.

Every vehicle equipped with such a command and control system is able to determine the location using global positioning system (GPS) technology, and then report that vehicle's information to higher command structures/systems using secure wireless linkages. Vehicles equipped with command and control systems also receive a variety of messages from higher command structures/systems, including the known locations of other related vehicles and other unknown or suspected locations of non-related vehicles. Command and control systems also allow vehicles to send and receive warning messages and in turn permit, for instance, the alerting of related vehicles about such significant events whether developing or in progress.

Though command and control systems warning messages are often manually generated, there are other information systems in use today, such as weather and tsunami stations, that automatically generate threat warning messages without human intervention. One of the military systems that automatically generates a threat warning message is the AN/TPQ-36 Firefinder Counter-fire Radar, which is able to detect projectiles in flight, compute their predicted points of origin and predicted points of impact, and automatically broadcast this information to other systems. The above described system still leaves the most numerous and vulnerable assets, humans, exposed to threats. Thus, there is a need to significantly enhance survivability.

Accordingly, there is a need for a network information system that allows command organizations/structures to know the location in real time of all their remote human assets, such as dismounted soldiers, emergency responders, remote construction crews, etc., as well as warn those assets whenever an event, such as a threat, exists or is inbound. These warnings must be expeditiously distributed, received, and processed to permit sufficient time for potentially affected human assets to alter their protective posture and/or take positive actions in response to the predicted event. In the past, this quick response time has not been achieved in practice. This is understandable when considering the vast number of end systems, and resulting costs required to equip every remote human asset in a field of operations.

Further, there is a need for a system that enables training, simulation, and rehearsal capabilities, along with real-time use by organizations, first responders, public safety, emergency management personnel, etc. for providing warning of harmful events, such as natural disasters, medical emergencies, military threats, homeland security events, and natural disaster incidents. In addition, there is a need for remotely located individuals, such as skiers, hikers, etc. to be provided with warning of harmful events, such as sudden violent weather changes, avalanches, and natural disasters. Further, there is a need for remotely located vehicles and vessels to be provided with a warning of potentially harmful events, such as, for example, violent ocean conditions, sea state changes, and tidal waves.

It is, therefore, an object of the present invention to provide a networked information system, and user warning and positioning device for integration within said system, that combines a plurality of components to effectively distribute a real-time event warning/notification to many individual entities across dispersed locations, as well as a computer program product therefor. These individual entities, in turn, can then determine, at the individual point, whether or not these predicted events pertain to their locales, and react accordingly.

It is another object of the present invention to enable the networked information system to monitor other connected information systems for externally and internally generated event warning/notification messages.

It is yet another object of the present invention to transmit event warning/notification messages on a secure wireless network to user warning and positioning devices in communication with the system, whenever event warning notifications/messages are received.

It is another object of the present invention to enable the user warning and positioning devices of the present system to retransmit received event warning/notification messages to other user warning and positioning devices in the system that may not have received the original message.

It is a further object of the present invention to provide a tailored event warning/notification to a user of the networked information system, user warning and positioning device and computer program product of the present invention, based on message and user-defined setup parameters.

Still a further object of the present invention is to track the location of each organization, individual human asset and/or vehicle equipped with a user warning and positioning device, and periodically report this location information to designated command and control organizations/structures, whether space-based, airborne, terrestrial and/or marine-based, using standard or customized messaging formats.

Another object of the present invention is to enable the warning of each equipped organization, individual human asset, vehicle, or other entity every time a significant event is predicted to occur or impact within a given distance from the individual user's location. In doing so, it is desirable that the distance parameter be kept to a minimum, to preclude false positives, but also account for an expected event radius or area as well as for errors in determining the location of the user, and of the predicted point of event or impact.

It is another object of the present invention to provide a secure network system, by using encrypted communications. However, the end system itself should not compromise friendly forces, even when captured intact by an opponent. This means that the information contained in the user warning and positioning devices carried by individual assets or in vehicles should be minimal, and of extremely limited utility to an adversary, in the case of a military or confidential application.

Furthermore, it is an object of the present invention to incorporate mechanisms that allow lost or captured user warning and positioning devices to be selectively excluded from participating in the network.

It is still another object of the present invention to permit assets/users to carry an unobtrusive user warning and positioning device that is of minimal size. It is also an object of the present invention that the user warning and positioning device of the present system be capable of operating for extended periods of times, on the order of weeks and months, in a tactical environment, with no required user interaction.

It is a further object of the present invention that the networked information system, user warning and positioning device, and computer program product of the present invention be applicable to training, simulation and rehearsal, along with real-time use by organizations, such as first responders, public safety, emergency management personnel, and provide warning of harmful events, such as emergency response, homeland security, natural disaster incidents. In addition, it is an object of the present invention that the system, user warning and positioning device, and computer program product be applicable to remotely located individuals, such as skiers, hikers, etc., to be provided warning of harmful events, such as sudden violent weather changes, avalanches, natural disasters, etc.

Further, it is an object of the present invention that same be applicable to remotely located vehicles and vessels, so as to provide warning of harmful events, such as violent ocean conditions/sea state changes/tidal waves, for example.

It is also an object of the present invention, in order to overcome the difficulties discussed above, to provide a software program product for use in such a system and user warning and positioning device, to automatically facilitate the real-time user warning notification to many individual entities equipped with the user warning and positioning devices across dispersed locations.

These and other objects in advantages of this invention will become apparent when considered in light of the following description when taken together with the accompanying drawings.

Accordingly, the present invention provides a robust, versatile and cost-effective solution for event warning/notification for individual entities. Unlike other notification approaches, this method allows for remote and virtually instantaneous, geographically distributed notification of future events or threats.

SUMMARY OF THE INVENTION

The present invention has been made to solve the problems associated with the prior art inability to cost-effectively provide real-time warning notification to numerous remotely located human assets (users), as described above. In order to achieve the objects of the present invention, as discussed above, the present inventors have earnestly endeavored to create a network information system, user warning and positioning device therefor, and computer program product for use in the network information system and user warning and positioning device, to effectively distribute to numerous individuals over a dispersed area, event warning messages in a timely fashion.

In particular, in a first embodiment of the present invention, a network event warning system enabling distribution of event warning messages to one or more individual entities within the network information system is provided comprising:

(a) one or more situational awareness workstation and threat warning gateways capable of receiving event warnings from linked and/or remote sensors, and/or other externally generated event warning messages, the situation awareness workstation and threat warning gateways selected from the group consisting of fixed location gateways and tactical/mobile gateways, each of said gateways comprising:

a wireless communications means capable of receiving and transmitting data; and a situational awareness workstation computing means in communication with the wireless communication means;

(b) one or more network bridges in communication with the situational awareness workstation and threat warning gateways, each network bridge defining a local node, said network bridges providing a communications interface between individual user warning and positioning devices and the situational awareness workstation and threat warning gateways, each of said network bridges comprising:

(i) a network bridge wireless communications means capable of receiving from and transmitting data to individual user warning and positioning devices, sensors, and command and control systems; and (ii) network bridge computer processing means in communication with the network bridge and network wireless communications means;

(c) one or more user warning and positioning devices, each user warning and position device defining an individual node, each of said devices comprising:

(i) a power supply (i) a warning and positioning device computer processing means in communication with the power supply;

(iii) a global positioning system (GPS) receiver means capable of calculating the location of the user warning and positioning device, said GPS receiver means in communication with the power supply and the warning and positioning device computer processing means;

(iv) a wireless communications means in communication with the power supply, warning and positioning device computer processing means, and GPS receiver means; and (v) one or more sensory notification means in communication with the power supply and the warning and positioning device computer processing means;

(d) network situational awareness workstation application program code embodied on a computer readable medium for execution on the situational awareness workstation and threat gateway computer processing means capable of authenticating event warning messages, processing and analyzing the event warning messages via an event prediction determination process to produce predicted future event warning messages, and distributing future event warning messages to the network bridges comprising:
  (i) application program code operable to decode and authenticate a valid event warning message, input directly or indirectly into one or more of the situational awareness workstation and threat warning gateways, by verifying the digital signature of the event warning message;
  (ii) application program code operable to input and authenticate event warning message into an event prediction determination process, thereby analyzing the event warning message to predict a corresponding future event with associated relevant information including predicted event type, location, area impacted, start time, and duration;
  (iii) application program code operable to distribute the predicted future event and associated relevant information to one or more network bridges within the information network, with or without regard to whether a specific local or individual node will be affected by the predicted future event;
  (iv) application program code operable to convert the format of the predicted future event information, in terms of electronic format and content, to alternative electronic formats, before distribution;

(e) bridge application program code embodied on a computer readable medium for execution on the network bridge computer processing means for processing event warning messages received from the situational awareness workstation and threat warning gateways, and other external sources, and distributing an authenticated event warning message of an event to occur in the future, said bridge application program code comprising:
  (i) application program code operable to automatically verify the authenticity of event warning messages reporting an event to occur in the future, by examining its digital signature, so as to produce either an invalid or valid event warning message;
  (ii) application program code operable to input a valid event warning message into an event prediction process, wherein the predicted time of the event is compared with the local time, to determine whether the event will occur at some future time;
  (iii) application program code operable to automatically compare the locale to be affected by an authenticated event warning message of an event to occur in the future within the locale of the local node, to determine the affected area;
  (iv) application program code operable to send notification to one or more user warning and positioning devices within the affected area of an authenticated event warning message of an event predicted to occur in the future;
  (v) application program code operable to relay the event warning message to other local and individual nodes not in the area of the predicted event warning message;
  (vi) application program code operable to log off and discard all invalid and elapsed event warning messages;
  (vii) application program code operable to input and translate authenticated event warning messages from individual user warning and positioning devices into other message formats utilized by other different command and control systems;
  (viii) application program code operable to filter event warning messages that should not be sent from one network to the other;
  (ix) application program code operable to track the status of user warning and positioning devices with which the network bridge is in communication with;
  (x) application program code operable to enable the network bridges to communicate with sensors, individual user warning and positioning devices, and command and control systems, using different networks and protocols;
  (xi) application program code operable to issue keys acting as the root certificate authority for all nodes in the network, thereby permitting the network bridges and user warning and positioning devices to authenticate each other;

(f) user warning and positioning device application program code embodied on a computer-readable medium for execution on the user warning device computer processing means in conjunction with the bridge application program code and the situational awareness workstation program code, said user warning device application program code being capable of decoding messages, validating and analyzing event warning messages, issuing a notification of an event predicted to occur in the future in the locale of the user warning and positioning device, and relay received messages, said user warning and positioning device application program code comprising:
  (i) application program code operable to receive and authenticate event warning messages by verifying the digital signature of the event warning messages;
  (ii) application program code operable to decode incoming coded messages;
  (iii) application program code operable to query a local cache of relayed messages to determine whether an event warning message has already been relayed;
  (iv) application program code operable to relay event warning messages to local and individual nodes concerning an event that has not as yet happened and has not as yet been relayed;
  (v) application program code operable to compare the time of the predicted event to the local time, to determine whether the predicted event will occur at some future time and, if it will, authenticate the message;
  (vii) application program code operable to log and then discard all invalid or elapsed messages;
  (viii) application program code operable to compare the locale to be affected by the predicted future event with the locale of the individual node;
  (ix) application program code operable to activate the sensory notification means of the user warning and positioning device when a valid event warning is received, based upon the time remaining until the predicted event; and
  (x) application program code operable to periodically transmit messages to local and/or central nodes containing data concerning the unique identifier and location of the user warning and positioning device, and a timestamp of the message.

In a second embodiment of the present invention, the network event warning system of the first embodiment is provided, wherein the bridge application program code further comprises:

application program code operable to selectively disable or alter individual user warning and positioning devices that appear to have been compromised or lost.

In a third embodiment of the present invention, the network event warning system of the first embodiment is provided, wherein the bridge application program code further comprises:

application program code operable to reconfigure any parameters in the individual user warning and positioning devices, and application program code therein.

In a fourth embodiment of the present invention, the network event warning system of the first embodiment is provided, wherein the bridge application program code further comprises:

application program code operable to interface one or more of the network bridges with an optional laptop computer running on an operating system.

In a fifth embodiment of the present invention, the network event warning system of the first embodiment is provided, wherein the bridge application program code further comprises:

application program code operable to revoke the certificate of a user warning and positioning device.

In a sixth embodiment of the present invention, the network event warning system of the first embodiment above is provided, wherein the user warning and positioning device application program code further comprises:

application program code operable to convert event warning messages to human voice warnings, said human voice warnings comprising instructions on what subsequent action to take.

In a seventh embodiment of the present invention, the network event warning system of the first embodiment is provided, wherein the user warning and positioning device application program code further comprises:

application program code operable to encrypt outgoing messages.

In a seventh embodiment of the present invention, the network event warning system of the first embodiment is provided, wherein the user warning and positioning device application program code further comprises:

application program code operable to utilize spread-spectrum technology to prevent basic triangulation efforts by an adversary to locate the user warning and positioning device.

In an eighth embodiment of the present invention, the network event warning system of the first embodiment is provided, wherein the user warning and positioning devices are capable of communicating over wired or wireless systems to the network bridges and other user warning and positioning devices.

In a ninth embodiment of the present invention, the network event warning system of the first embodiment is provided, wherein the user warning and positioning device application program code further comprises:

application program code operable to reconfigure the files stored in the user warning and positioning device.

In a tenth embodiment of the present invention, the network event warning system of the first embodiment is provided, wherein the bridge application program code further comprises:

application program code operable to connect user warning and positioning devices to command and control systems and sensor systems.

In an eleventh embodiment of the present invention, a computer program product for tactical event warning over a network event warning system is provided, comprising:

(a) network situational awareness workstation application program code embodied on a computer readable medium for execution on a the situational awareness workstation computer processing means of one or more of the situational awareness workstation and threat warning gateways capable of authenticating received event warning messages, processing and analyzing the event warning messages via an event prediction determination process to produce predicted future event warning messages, and distributing future event warning messages to network bridges comprising:

(i) application program code operable to decode and authenticate a valid event warning message, input directly or indirectly into the situational awareness workstation computer processing means, by verifying the digital signature of the event warning message;

(ii) application program code operable to input and authenticate event warning messages into an event prediction determination process, thereby analyzing the event warning message to predict a corresponding future event with associated relevant information including predicted event type, location, area impacted, start time, and duration;

(iii) application program code operable to distribute the predicted future event and associated relevant information to network bridges within the network, with or without regard to whether a specific local or individual node will be affected by the predicted future event;

(iv) application program code operable to convert the format of the predicted future event information, in terms of electronic format and content, to alternative electronic formats, before distribution;

(b) bridge application program code embodied on a computer readable medium for execution on a network bridge computer processing means for processing event warning messages received from the central computer processing means, and other external sources, and distributing an authenticated event warning message of an event to occur in the future, said bridge application program code comprising:

(i) application program code operable to automatically verify the authenticity of event warning messages reporting an event to occur in the future, by examining its digital signature, so as to produce either an invalid or valid event warning message;

(ii) application program code operable to input a valid event warning message into an event prediction process, wherein the predicted time of the event is compared with the local time, to determine whether the event will occur at some future time;

(iii) application program code operable to automatically compare the locale to be affected by an authenticated event warning message of an event to occur in the future within the locale of the local node, to determine the affected area;

(iv) application program code operable to send notification to all user warning and positioning devices (individual nodes), within or outside of the affected area of an authenticated event warning message of an event predicted to occur in the future;

(v) application program code operable to relay the event warning message to other local and individual nodes not in the area of the predicted strike warning message;

(vi) application program code operable to log off and discard all invalid and elapsed event warning messages;

(vii) application program code operable to input and translate authenticated event warning messages from individual user warning and positioning devices into other message formats utilized by other different command and control systems;

(viii) application program code operable to filtering event warning messages that should not be sent from one network to the other;

(ix) application program code operable to track the status of user warning and positioning devices with which the network bridge is in communication with;

(x) application program code operable to enable the network bridges to communicate with sensors, individual user warning and positioning devices, and command and control systems, using different networks and protocols;

(xi) application program code operable to issue keys acting as the root certificate authority for all nodes in the network, thereby permitting the network bridges and user warning and positioning devices to authenticate each other;

(c) user warning and positioning device application program code embodied on a computer-readable medium for execution on a user warning device computer processing means in conjunction with the bridge application program code and the situational awareness workstation program code, said user warning device application program code being capable of decoding messages, validating and analyzing event warning messages, and then issuing a notification of an event predicted to occur in the future in the locale of the user warning device, said user warning device application program code comprising:

(i) application program code operable to authenticate event warning messages by verifying the digital signature of the event warning messages;

(ii) application program code operable to decoding incoming coded messages;

(iii) application program code operable to query a local cache of messages to determine whether an event warning message has already been relayed;

(iv) application program code operable to relay event warning messages concerning an event that has not as yet happened and has not as yet been relayed;

(v) application program code operable to compare the time of the predicted event to the local time, to determine whether the predicted event will occur at some future time and, if it will, authenticate the message;

(vi) application program code operable to compare the locale to be affected by the predicted future event with the locale of the individual node;

(vii) application program code operable to notify local and individual nodes within the affected area of the predicted future event, and activate user warning and positioning devices based upon the time remaining until the predicted event; and (viii) application program code operable to activate one or more sensory notification means in the user warning and positioning devices when a valid event warning message is received.

In a twelfth embodiment of the present invention, the computer program product of the eleventh embodiment above is provided, wherein the network bridge application program code further comprises:

application program code operable to selectively disable or alter individual user warning and positioning devices that appear to have been compromised or lost.

In a thirteenth embodiment of the present invention, the computer program product of the eleventh embodiment above is provided, wherein the network bridge application program code further comprises:

application program code operable to reconfigure any parameters in the individual user warning and positioning devices and application program code therein.

In a fourteenth embodiment of the present invention, the computer program product of the eleventh embodiment above is provided, wherein the network bridge application program code further comprises:

application program code operable to interface one or more network bridges with an optional laptop computer running on a conventional operating system.

In a fifteenth embodiment of the present invention, the computer program product of the eleventh embodiment is provided, wherein the network bridge application program code further comprises:

application program code operable to revoke the certificate of a user warning and positioning device.

In a sixteenth embodiment of the present invention, the network event warning system enabling distribution of event warning messages to one or more individual entities within the network information system of the first embodiment above is provided, wherein the warning and positioning device computer processing means is a single board computer.

In a seventeenth embodiment of the present invention, the network event warning system enabling distribution of event warning messages to one or more individual entities within the network information system of the sixteenth embodiment above is provided, wherein the single board computer comprises an advanced power management means to permit conservation of power by putting the single board computer in sleep mode when not in use.

In an eighteenth embodiment of the present invention, the network event warning system enabling distribution of event warning messages to one or more individual entities within the network information system of the first embodiment above is provided, wherein the wireless communications means of the user warning and positioning device is a radio frequency transceiver module.

In a nineteenth embodiment of the present invention, the network event warning system enabling distribution of event warning messages to one or more individual entities within the network information system of the first embodiment above is provided, wherein the sensory notification means comprise one or more of auditory and vibrating alarms.

In a twentieth embodiment of the present invention, the network event warning system enabling distribution of event warning messages to one or more individual entities within the network information system of the first embodiment above is provided, wherein the GPS receiver means, warning and positioning device computer processing means, and the wireless communication means communicate using universal asynchronous receive/transmit (UART) serial lines.

In a twenty first embodiment of the present invention, the network event warning system enabling distribution of event warning messages to one or more individual entities within the network information system of the first embodiment above is provided, wherein the sensory notification means communicate with the warning and positioning device computer processing means via general purpose input/output (GPIO) lines.

In a twenty second embodiment of the present invention, a user warning and positioning device for use in a network event warning system enabling distribution of event warning messages to one or more individual entities within the network information system is provided, the user warning and positioning device comprising:

(i) a power supply;
(ii) a warning and positioning device computer processing means in communication with the power supply;
(iii) a global positioning system (GPS) receiver means capable of calculating the location of the user warning and positioning device, said GPS receiver means in communication with the power supply and the warning and positioning device computer processing means;
(iv) a wireless communications means in communication with the power supply, warning and positioning device computer processing means, and GPS receiver means; and
(v) one or more sensory notification means in communication with the power supply and the warning and positioning device computer processing means.

In a twenty third embodiment of the present invention, the user warning and positioning device of the twenty second embodiment is provided, wherein the warning and positioning device computer processing means is a single board computer.

In a twenty fourth embodiment of the present invention, the user warning and positioning device of the twenty third embodiment is provided, wherein the single board computer comprises an advanced power management means to permit the conservation of power by putting the single board computer in sleep mode when not in use.

In a twenty fifth embodiment of the present invention, the user warning and positioning device of the twenty second embodiment is provided, wherein the wireless communications means is a radio frequency transceiver module.

In a twenty sixth embodiment of the present invention, the user warning and positioning device of the twenty second embodiment is provided, wherein the sensory notification means comprise one or more of auditory and vibrating alarms.

In a twenty seventh embodiment of the present invention, the user warning and positioning device of the twenty second embodiment is provided, wherein the GPS receiver means, warning and positioning device computer processing means, and the wireless communication means communicate using universal asynchronous receive/transmit (UART) serial lines.

In a twenty eighth embodiment of the present invention, the user warning and positioning device of the twenty second embodiment is provided, wherein the sensory notification means is in communication with the warning and positioning device computer processing means via general purpose input/output (GPIO) lines.

In a twenty ninth embodiment of the present invention, the user warning and positioning device of the twenty second embodiment is provided, further comprising:

user warning and positioning device application program code embodied on a computer-readable medium for execution on the user warning device computer processing means for communication with the network event warning system, said user warning device application program code being capable of decoding messages, validating and analyzing event warning messages, issuing a notification of an event predicted to occur in the future in the locale of the user warning and positioning device, and relay received messages, said user warning device application program code comprising:

(i) application program code operable to receive and authenticate event warning messages by verifying the digital signature of the event warning messages;
(ii) application program code operable to decode incoming coded messages;
(iii) application program code operable to query a local cache of relayed messages to determine whether an event warning message has already been relayed;
(iv) application program code operable to relay event warning messages to local and individual nodes concerning an event that has not as yet happened and has not as yet been relayed;
(v) application program code operable to compare the time of the predicted event to the local time, to determine whether the predicted event will occur at some future time and, if it will, authenticate the message;
(vii) application program code operable to log and then discard all invalid or elapsed messages;
(viii) application program code operable to compare the locale to be affected by the predicted future event with the locale of the individual node;
(ix) application program code operable to activate the sensory notification means of the user warning and positioning device when a valid event warning is received, based upon the time remaining until the predicted event; and
(x) application program code operable to periodically transmit messages to local and/or central nodes containing data concerning the unique identifier and location of the user warning and positioning device, and a timestamp of the message.

BRIEF DESCRIPTION OF THE DRAWINGS

The accompanying drawings, which are included to provide further understanding of the present invention, and are incorporated in and constitute a part of the specification, illustrate preferred embodiments of the present invention, and together with the description serve to explain the principles of the present invention. The present invention will now be described further with reference to the accompanying drawings as follows.

DETAILED DESCRIPTION OF THE PREFERRED EMBODIMENTS

Figure 1:
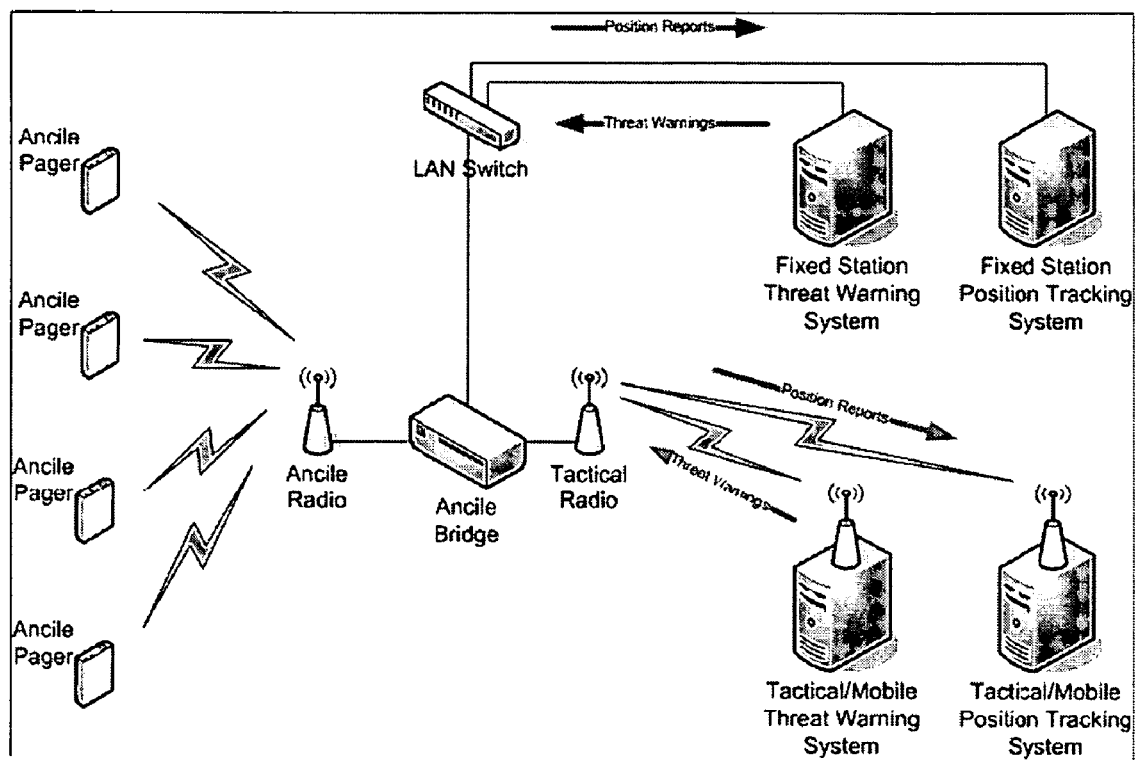
FIG. 1 is a perspective view illustrating the distributed event warning/notification system for individual entities of the present invention illustrating the flow of information to the situational awareness work station and threat warning gateways, the affiliated network bridges, and individual user warning and positioning devices of the network of the present invention.

The following section describes various preferred embodiments of the present invention, while exemplifying the distributed event warning/notification system, user warning and positioning device, and computer program software of the present invention.

The present invention applies engineering design principles to improve commercial products and military applications for situational awareness and event warning. The present invention is a networked information system that combines hardware components, wireless technologies, and computer software programs to provide a system for real-time event warning/notification to many individual entities across dispersed locations. These entities, in turn, may determine whether or not these events pertain to their locales and react accordingly by activating an sensory alert mechanism therein.

For instance, if the system is notified that an artillery shell is in the air and will strike a certain point at a certain time, this message may be distributed to all nodes within the system (i.e., all network bridges and user warning and positioning devices), or alternatively to only those nodes to be affected by the threat, allowing those assets within the danger radius to be alerted. The present invention supports a plurality of network types, e.g., radio, local area networks, etc. and a plurality of system architectures, e.g. centralized, semi-distributed, distributed, etc.

The present invention's system architecture satisfies the present invention's objectives by determining, at the central, local, or user location, as desired, whether a user, such as a public safety professional or soldier, is inside a predicted future event area. This system achieves same by comparing the location of an individual user at the time of receipt of the future event warning at the central, local, or user warning and positioning device, with each known event or threat area to determine whether or not said user must be warned at that time, or at a later time up through the predicted future time of the event as the user changes geographic locations.

This is the most computationally intensive calculation required to satisfy the system and method objectives, as errors in this calculation can either erode trust in the system or result in injury or death, or both, of the user. Accordingly, the present invention's architecture permits the ongoing computation of user locations and threat areas at the end user warning and positioning devices from the time of receipt of the future event warning message at the user warning and positioning device up to the predicted future event time, and the periodic transmission of messages from the user warning and positioning device to local and/or central nodes containing data concerning the unique identifier and location of the user warning and positioning device, and a timestamp of the message.

The present invention further provides a robust solution in the case of loss, compromise or incapacitation of a computational node, e.g., the user warning and positioning device, by, for example, affecting only the individual user, such as a public safety professional or soldier. Specifically, according to the present invention, network bridges are utilized to connect the user warning and positioning devices to command and control systems, and sensor systems, wherein the user warning and positioning devices are not affiliated with a specific network bridge. Instead, each user warning and positioning device is able to exchange messages with any other system component, whether that system component is another user warning and positioning device or a network bridge. The present invention is advantageous in that it increases the robustness of the ability to provide warnings within an event area or structure, such as a building, since each node is often multi-homed.

Accordingly, as shown in FIG. 1, the present invention provides a distributed warning/notification method and system of the present invention. In particular, situational awareness workstation and threat warning gateways are provided, in the form of fixed location gateways and/or tactical/mobile gateways, to provide the principle data management in communication with one or more network bridges via LAN or radio networks. These network bridges, in turn, communicate with the user warning and positioning devices associated with the network.

Event warning information consists of data such as event type, time of the event, locale of the event, etc. Subsequently, an event warning message is communicated to the network bridges, and in turn communicated to the user warning and positioning devices in communication therewith.

Location (position) information of the assets (users) is generated in the user warning and positioning devices, via geographical positioning means (GPS) therein, and position messages periodically sent from the user warning and positioning device concerning the unique identifier and location of the user warning and positioning device, and a timestamp of the position message, to the network bridges via the geographical positioning means (GPS) and wireless transmission means of the user warning and positioning device. The position messages received from the individual user warning and positioning devices are then communicated from the network bridges to the situational awareness workstation and threat warning gateways.

For example, when an event warning message is received by a gateway, location and time of the event is calculated, and an event warning message is sent to the network bridges. The event warning message is then communicated to either all of the user warning and positioning devices, or only those devices to be affected, and then the message is relayed from the individual user warning and positioning devices (individual nodes), to other local and individual nodes. Thus, event and asset location information may be communicated not only to those assets (individual nodes) within the affected or threat area, but also to and between assets not in the affected or threat area. Accordingly, threat and location information may be communicated to all associated user warning and positioning devices within the system, if desired.

Figure 2:
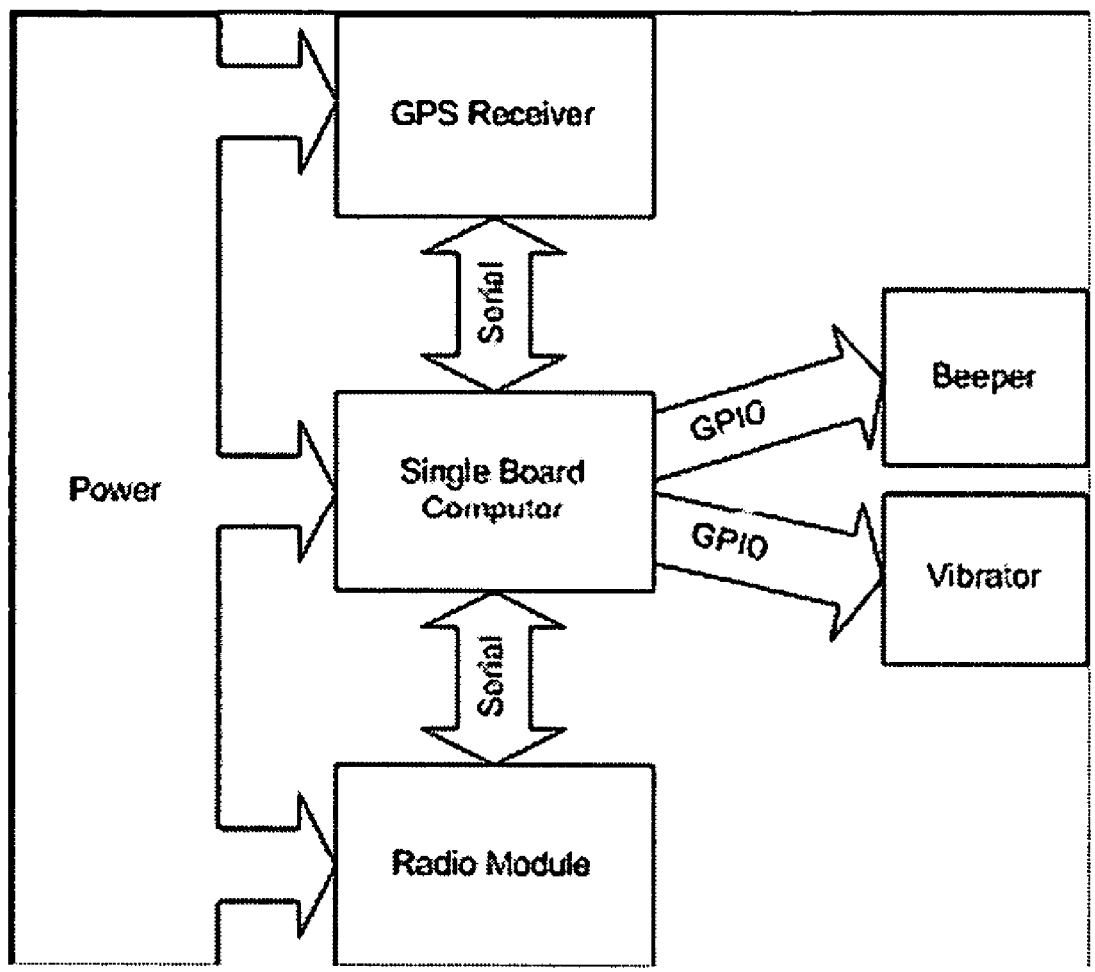
FIG. 2 is a box diagram illustrating the components, and interconnectivity thereof, of the user warning and positioning device of the present invention.

The present invention's system includes three types of nodes: the gateways (central nodes), network bridge devices (local nodes), and user warning and positioning devices (individual nodes), e.g., pager-sized modularized user warning and positioning devices, as illustrated in FIGS. 1 and 2. The network bridge devices communicate on at least two separate networks. Most commonly, one of these networks is the network over which the pager-size user warning and positioning devices communicate. The other network(s) allows the system to receive externally-generated event warning/notification messages.

The pager-sized user warning and positioning devices communicate wirelessly with the network bridge devices that receive alerts from the situational awareness workstation and threat warning gateway, other network bridge devices, other user warning and positioning devices and/or other information systems communicating over a wired or wireless network. As shown in FIG. 2, the user warning and positioning device consists of five major components, i.e., a power supply, a GPS receiver, a single board computer (SBC), a radio frequency transceiver module (Radio), and alarms (both auditory and vibrating). The GPS, SBC and Radio are interconnected using universal asynchronous receive/transmit (DART) serial lines. The alarms are connected to the SBC using general purpose input/output (GPIO) lines.

In one preferred embodiment of the user warning and positioning device, the single board computer (SBC) is the Gumstix® Basix™ 400f, which is based on the Intel XScale® PXA255 processor running at 400 MHz, with 64 MB of SDRAM, and 4 MB of Flash RAM. It also has a Linux 2.6 kernel, and has a very small form factor. The SBC has multiple serial ports and a plurality of general purpose input/output (GPIO) ports. Further, the radio module is the 9XTend™ wireless module by MaxStream®. It is a 900 MHz frequency hopping, spread spectrum transceiver capable of transmitting at power levels between 1 milliwatt to one watt. The module also incorporates 256-bit Advanced Encryption Standard (AES) encryption and has a simple universal asynchronous receiver/transmitter (UART) interface that is controlled with standard AT commands. The 9XTend™ supports up to 65,000 network addresses on 10 independent networks.

The GPS receiver of the above preferred embodiment is the FS Oncore™ by Mototola®, which is very small, inexpensive, and capable of operating with very weak signal levels of around −142 dBm. Furthermore, the FS Oncore™ provides a host of advanced functionality, including serial communications and the National Marine Electronics Association (NMEA) communications interface. This means that the SBC can communicate with the GPS receiver using text commands on a serial interface, which simplifies the software design. The advanced power management function of the user warning and positioning device permits the conservation of power by putting the chip (the single board computer) in sleep mode when not in use. Although not depicted, a custom printed circuit board was used, wherein most of the circuits are related to power.

The single board computer is at the center of the user warning and positioning device, and is where the user warning and positioning device application software program product is executed. This software initializes all system components upon power up, and then repeats the following basic steps:

1) Check to see if an event warning/notification message has been received;
2) Transmit the device's location if the update interval has elapsed; and
3) Check to see if a new physical connection has been made.

Whenever an event warning/notification message is received, its time is compared to the local time to determine if the event will occur in the future, or has already happened. If the event will occur in the future, the authenticity of the event warning message is verified by examining its digital signature. If the signature is valid, the application software program will activate the alarm based on the time remaining until impact. It will also re-transmit the message so that other devices that may not be in range of the originating device may also receive this message. All invalid or elapsed warning messages are logged and then discarded. The re-transmission feature can be disabled to prolong power life or reduce the risk of enemy detection.

The user warning and positioning device, running the application software program on the SBC, also transmits periodic messages to the local nodes containing the unique identifier of the device, location of the device, and timestamp of the message. The frequency of these messages is indicated in the configuration file. Whenever the update interval transpires, the user warning and positioning device transmits the above message so that other devices on the network can track the location of that particular user warning and positioning device. If desired, however, this functionality can be disabled in the device configuration.

The present invention permits message and source authentication, encryption, secure reconfiguration of devices and remote zero. Accordingly, the system, user warning and positioning device and application software program product utilize public key infrastructure (PKI) to mitigate security risks to the system itself. In particular, when the individual warning device is initially configured, it is loaded with a plurality, e.g., four, separate encryption keys: 1) the device's own certificate, 2) the device's own private key, 3) the certificate of the bridge serving as the root certificate authority, 4) the shared secret key for encrypting messages.

Further, keys are issued by the network bridge device that is acting as the root certificate authority for all nodes in the network. Certificates are signed by this root CA to allow nodes to authenticate one another. Moreover, certificate revocation is provided. Thus, the invention permits both a device and its bridge to authenticate each other and is particularly important whenever the device's configuration is remotely modified. As a practical field operation protocol, the only key that should be changed over the air is the shared secret key, but only after the identity of the bridge has been verified.

Moreover, transmission encryption is provided. In the preferred embodiment of the user warning and positioning device described above, the 9Xtend™ wireless radio module has built-in support for transmission encryption using the advanced encryption standard (AES) with a 256-bit secret key. The AES algorithm meets Federal Information Processing Standard 197 (FIPS-197). Accordingly, the encryption key cannot be read out of the module by any means. The entire payload of the packet is encrypted using the key, and the cyclic redundancy check (CRC) is computed across the ciphertext. A module with the wrong key (or no key) will still receive encrypted data, but this data will be useless in its meaning. Likewise, a module with a key will still receive unencrypted data sent from a module without a key, but the output will be similarly meaningless.

According to the present invention, certain types of messages, such as messages instructing a user warning and positioning device to modify its configuration, are authenticated upon receipt. Specifically, in such a case, the user warning and positioning devices will verify the identity of a message sender via an authentication process. The authentication process is performed according to the following steps:

Step 1: A network bridge sends a configuration message to a specific user warning and positioning device. This message contains a plurality of values, e.g., three, separated or parsed: 1) the parameter name, e.g., "retransmit"; 2) the desired value, e.g., "no"; and 3) the secure hash of the concatenated parameter name, equality sign, and value, e.g., retransmit=no. This secure hash is a hash, e.g., MD5, of the string encrypted using the bridge's private key.

Step 2: The recipient user warning and positioning device automatically looks in its cache for the sender's public key. If it doesn't find one, the user warning and positioning device automatically sends a request for this public key to the sender. The sender then subsequently sends a message back to the user warning and positioning device with its public key, which has been encrypted using the root CA's private key. The recipient user warning and positioning device that has the root CA's public key, decrypts the public key it received from the sender, and adds it to its cache.

Step 3: The recipient user warning and positioning device automatically computes the hash, e.g., MD5, of the received string, e.g., retransmit=no. It then automatically decrypts the received hash using the sender's public key and compares the received and the computed hash values. If they match, the recipient user warning and positioning device knows that this is a legitimate authentic message.

According to the present invention, although a fixed infrastructure may be utilized, there is no need for a fixed infrastructure. Thus, as shown in FIG. 1, the gateways may be fixed and/or tactical/mobile, and the many user warning and positioning devices are able to communicate with each other, as well as with any network bridges within range. Thus, the wireless communications subsystem supports a large number of individual nodes (user warning and positioning devices) and local nodes (network bridges) operating simultaneously within a broadcast environment.

Furthermore, since the system of the present invention can be deployed to hundreds of assets, e.g., soldiers in a theater of operation, emergency response personnel, etc., the wireless communications subsystem must also provide a mechanism for breaking up broadcast domains. The present invention permits different domains to be assigned to the various user warning and positioning devices, so that said devices may operate in close proximity to each other without interfering with each other's receiving and transmitting functions.

The user warning and positioning device of the present invention also provides for adaptive power management. The user warning and positioning device transmits at the lowest possible power level in order to conserve energy, as well as to minimize the risk of enemy detection in military or law enforcement applications. Alternately, the user warning and positioning devices is capable of transmitting at a fairly high power level when operating in challenging environments, such as densely developed urban areas or mountainous environments, or when the user, e.g., a soldier, is laying prone or the user's vehicle has a low profile. Thus, the present invention's communications module's output power is configurable in a flexible manner by the user warning and positioning device's computer processing means.

In one embodiment of the present invention, the user warning and positioning device's configuration file, encryption key, and/or software is updated using a physical or secure wireless connection from a trusted source. This trust, like the validity of received event warning messages, is based on a digital signature. The present invention's physical connections for updates permit the system to be securely reconfigured when a key or device has been compromised.

Also, the present invention considers the potential exploitation of these devices by adversaries, in the military or law enforcement applications. Given the fact that the user warning and positioning devices are configured to generate location reports periodically, it may be possible to triangulate the position of each asset. To address this threat, the present invention's communications module provides the capability to thwart basic triangulation efforts by, for example, utilizing spread-spectrum technologies. Spread-spectrum techniques are methods in which energy generated at a single frequency is deliberately spread over a wide band of frequencies. This is done for a variety of reasons, including increasing resistance to natural interference or jamming, and to prevent hostile detection. A contemporary application of this technique is used in the Single Channel Ground and Airborne Radio System (SINCGARS) by changing frequencies (frequency-hopping) several times per second. The current embodiment of this invention similarly uses frequency-hopping spread spectrum techniques.

In general, the objectives and functions of the network event warning system are carried out as follows:

In step 1, an action (event) occurs that generates a predictable event(s) that will occur in the future. (Example: An enemy artillery battery shoots at a friendly unit location.)

In step 2, the action (event) is detected by an action detection means, characterized via direct or indirect means to formulate action characterization information, and the action characterization information subsequently fed to one or more of the fixed and/or tactical/mobile gateways. Potential action detection mechanisms include optical, electromagnetic, radio frequency, and/or acoustic methods that discretely or in combination characterize the initial and/or ongoing action. (Example: A friendly artillery locating radar picks up the incoming enemy artillery round and accurately measures its ballistic-based path of flight).

In Step 3, the action characterization information is processed and analyzed by the gateways in a timely manner. The result of this analysis generates predicted corresponding future event and associated relevant information, and is constituted into an event warning message. The event warning message includes, for example, event type (e.g., enemy attack, approaching severe weather, etc.), predicted location/area impacted by the event, predicted start time of the event, and predicted duration of the event. For example, the gateways, separate from or integrated with a command and control system associated with friendly artillery locating radar, uses the ballistic-based path of flight and speed of the enemy artillery round information received from the friendly artillery locating radar to determine the predicted Time of Impact (PTI) and predicted point of impact (PPI) of the enemy artillery round, with corresponding affected area footprint considering any ballistic measurement errors).

In step 4, the event warning message is universally distributed to the local nodes (i.e., the network bridges) within the information network, with or without regard to whether a specific user warning and positioning device located within the area of a local node will be affected by the future event. In the distributed method of warning, event warning messages are communicated to all user warning and positioning devices, regardless of the relative position to the predicted area of the event. While there is increased load on the communications network (e.g., increased use of bandwidth) in such a "distributed" method, such a distributed method provides rapid and accurate event warning/notification to individual entities, since there are no time delays or asset location errors associated with unit position reporting latencies and centralized computational processes to determine which user warning and positioning devices will be specifically impacted by an event. Thus, the distributed method of warning permits very short warning/notification time windows between event detection and impact on individual entities.

In contrast to the distributed method, a centralized network configuration (wherein the event warning message is sent only to the network bridge and user warning and positioning devices in the affected area) may be utilized, wherein computational processes are performed in centralized locations, such as the gateways, to determine which user warning and positioning devices will be specifically impacted by an event, and the event warning message distributed only to the predetermined affected users. This method is more efficient in terms of the communications load, i.e., the amount of bandwidth used to broadcast a warning. However, such a system requires longer warning/notification time windows between event detection and impact on individual entities.

In step 5, which is optional, if either the communications network, information network, and/or versions of components within this system are heterogeneous in nature, then a translation of the event warning/notification message may be required in terms of format and content to insure compatibility and continuity of timely transmittal as the event warning/notification message makes it way to the electronically addressed assets, e.g., humans carrying user warning and positioning devices. For example, the command and control system generates a variable-message-format (VMF) based strike warning message(s). The unit-borne system addressed for receipt of this strike warning message is only able to parse and understand extensible Markup Language (XML) based messages. An interim system/device/process is required to translate the strike warning message from VMF to XML.)

In step 6, the asset-borne component of the system, i.e., the user warning and positioning devices, receive and locally parse/process the future event warning/notification message in a timely manner, via the warning and positioning device computer processing means running the computer program product of the present invention. Whenever an event warning message is received by the user warning and positioning device, the predicted time of the event is compared to the local time to determine whether or not the event will occur at some future time. If the event will occur in the future, the event warning message's authenticity is automatically verified by examining its digital signature. If the signature is valid, the locale that is affected by the future event is automatically compared to the locale of the individual node (e.g., the location of the user warning and positioning device). If the node is within the affected area, it will notify the user, via the sensory notification means (e.g., an audible alarm or voice message, and/or a vibrator) based on the time remaining until the future event The user warning and positioning device will also re-transmit the received event warning message, so that other individual and local nodes that may not be in range of the original transmission by the network bridge may also receive the event warning message. This greatly extends the geographical scope of the network system.

All invalid or elapsed warning messages are logged and then discarded by the user warning and positioning devices. The re-transmission feature on the user warning and positioning devices can be disabled to prolong power life or reduce the risk of detection in military and law enforcement applications. (Example: A pager-sized unit-borne user warning and positioning device carried by an individual dismounted soldier receives and validates an XML-base strike warning message. Computational logic within this device activates several notification mechanisms found within the device).

In step 7, based on the set of actions selected by the user warning and positioning device, the user is warned/notified via sensory mean(s), singular or in combination, prior to and during the time period of the event occurrence. These sensory indicia include auditory, visual, and/or physical stimulation of an individual's bodily senses. (Example: The pager-sized warning and positioning device both vibrates and sounds an audible alarm notifying the affected soldier to change his protective posture prior to impact of the enemy artillery round).

The present invention's network bridge(s) provide two principle functions. First, they provide an interface between the end devices, e.g., user warning and positioning devices, and the external systems that generate and utilize warning/notification information, such as the gateways. In this role, the network bridges translate messages received from other systems into event warning messages. In addition, the network bridges translate the messages received from the individual user warning and positioning devices into other message formats utilized by other different and multiple command and control systems. Thus, the network bridge also filters messages that should not be sent from one network to the other, e.g., spot reports coming from a terrestrial command and control system.

Second, the network bridge acts as a management device for the individual user warning and positioning devices. The network bridge keeps track of the status of the user warning and positioning devices with which it has communications contact, and permits the selective disablement or remote alteration of any individual user warning and positioning device that appears to have been compromised or lost. The network bridge permits the configuration and/or reconfiguration of any parameter in the individual user warning and positioning devices, e.g., changing the URN of a replacement device issued to a soldier.

The present invention's network bridges communicate with sensor, warning, and command and control systems (CCS's) that use different networks and protocols. For example, the present invention's network bridge can use the internet protocol (IP) at the network layer. Moreover, the network bridge can communicate using both a local area network (LAN) and a point-to-point (PPP) link in order to support both mobile/tactical and fixed installations.

In a preferred embodiment of the present invention, the network bridge device is implemented using a laptop computer running on a conventional operating system. The network bridge supports various formats, such as extensible Markup Language (XML) messages, over an Ethernet interface, Joint Variable Format Message (JVMF) over a point-to-point protocol (PPP) interface, etc. When a CCS is connected to a tactical network, e.g., SINCGARS, the CCS connects over its serial port to the Inter-Network Controller (INC), which is a tactical router mounted on the radio's vehicular adapter. The serial connection is established using PPP. Then, the CCS queries the INC to determine its configuration and, if necessary, reconfigures it using the simple network management protocol (SNMP). Thereafter, the CCS exchanges regular IP traffic, e.g., event warning messages, across the serial port. When the CCS is running on a LAN, multicast groups are utilized to transmit packets. By contrast, other sensor and warning systems use other languages, such as extensible markup language (XML) for the messages.

The present invention is applicable to numerous CCS's, such as space, airborne, terrestrial and marine-based system. For instance, multiple terrestrial-bases systems can be utilized. For example, some CCS's utilize non-persistent transmission control protocol (TCP) connections to send messages. Thus, such CCS's create a client socket that connects to a server socket on the receiving system, i.e., the present system's network bridge, sends the XML message, and then disconnects. On the other hand, other CCS's create a client socket that connects to the server socket on the receiving system, i.e., the network bridge of the present invention, and then maintains that connection indefinitely. When a message needs to be transmitted, there is no delay in setting up a connection and, if the connection is lost, the CCS will immediately detect the lost connection and try to re-establish it.

The present invention permits message and source authentication, encryption, secure reconfiguration of user warning and positioning devices, and remote zero. Accordingly, the system, user warning and positioning device, and computer program product of the present invention utilize public key infrastructure (PKI) to mitigate security risks to the system itself. According to a preferred embodiment of the present invention, when an individual user warning and positioning device is initially configured, it is loaded with a plurality, e.g., four, separate encryption keys as follows:

1) the device's own certificate;
2) the device's own private key;
3) the certificate of the network bridge serving as the root certificate authority; and
4) the shared secret key for encrypting messages.

Further, keys are issued by the network bridges that are acting as the root certificate authority for all nodes in the network bridge area of operation. Certificates are signed by this root certificate authority (CA) to allow nodes (such as user warning and positioning devices and network bridges) to authenticate one another. Moreover, certificate revocation is provided. Thus, the present invention permits both a user warning and positioning device and its associated network bridge to authenticate each other, and is particularly important whenever the user warning and positioning device's configuration is remotely modified. As a practical field operation protocol, the only key that should be changed over the air is the shared secret key, but only after the identity of the network bridge has been verified.

Moreover, transmission encryption is provided. Accordingly, the encryption key cannot be read out of the module by any means. The entire payload of the data packet is encrypted using the key, and the cyclic redundancy check (CRC) is computed across the ciphertext. A module with the wrong key (or no key) will still receive encrypted data, but this data will be unreadable and useless. Likewise, a module with a key will still receive unencrypted data sent from a module without a key, but the output will be similarly meaningless.

According to the present invention, certain types of event warning messages are authenticated upon receipt. Specifically, in these cases the user warning and positioning devices will verify the identity of a message sender when the received message instructs the user warning and positioning device to modify its configuration. Thus, authentication is performed according to the following steps:

Step 1: A network bridge sends a configuration message to a specific user warning and positioning device. This message contains a plurality of values, e.g., three, separated or parsed values as follows:

1) the parameter name, e.g., "retransmit");

2) the desired value, e.g., "no"; and 3) the secure hash of the concatenated parameter name, equality sign, and value, e.g., retransmit=no. This secure hash is a hash, e.g., MD5, of the string encrypted using the bridge's private key.

Step 2: The recipient user warning and positioning device automatically looks in its cache for the sender's (the network bridge mentioned in Step 1) public key. If it doesn't find one, the user warning and positioning device automatically sends a request for this key to the sender. The sender subsequently sends a message with its public key, which has been encrypted using the root certificate authority's private key. The recipient that has the root CA's public key, decrypts the key it received and adds it to its cache.

Step 3: The recipient user warning and positioning device automatically computes the hash, e.g., MD5, of the received string, e.g., retransmit=no. The user warning and positioning device then automatically decrypts the received hash using the sender's public key and compares the received and the computed hash values. If they match, the recipient user warning and positioning device knows that the received configuration message is a legitimate authentic message.

According to the present invention, the event warning message may reach as many user warning and positioning devices as possible, as the event warning messages may be transmitted to all network bridges and all individual nodes, even if these network bridges and nodes do not appear to be inside the affected area. In the event that a number of user warning and positioning devices are not in communication contact with a network bridge at a particular point in time, the system of the present invention allows the user warning and positioning devices to selectively relay future event warning messages, including multiple occurrences.

The present invention permits retransmission of event warning messages, in appropriate instances, depending on the specified configuration of the user warning and positioning devices, e.g., when the event warning message contains an appropriate configuration file. Thus, a specific event warning message can be transmitted once or multiple times. In the case that the event warning message is to be communicated only once, e.g., to prevent redundancy of an event warning message that has already occurred, the system will ensure that it is configured not to allow retransmissions. The system checks, e.g., a local cache, to ensure the message has not already been relayed. Conversely, in the case of retransmission, the system checks to ensure that the threatened event has not occurred in the past.

The present invention is also particularly robust through its integration of verbal (as opposed to plain sound) warnings. In particular, specific event warning messages are transmitted to the user warning and positioning device, decoded therein to determine the future event and appropriate spoken warning to be broadcast, and a corresponding audible spoken warning made to the user, so that users hear a human voice broadcast by the user warning and positioning device, instructing the user as to what subsequent actions to undertake.

The system, user warning and positioning device, and computer program product of the present invention are also useful for training, simulation, and rehearsal, along with real-time use by organizations such as first responders, public safety, emergency management personnel with warning of harmful events, such as emergency response, homeland security, natural disaster incidents, etc. For example, the present invention supports first responders in disaster areas by tracking their location and allowing a command post to send a danger signal (i.e., and event warning message) if an unsafe condition is detected in a particular sector. The danger signal would only affect the personnel in the danger area such as, perhaps, a building about to collapse.

In another example, the present invention supports law enforcement officers by allowing a precinct to position the officers to best deter or respond to criminal activity. Further, the present invention provides remotely located individuals, such as skiers, hikers, etc., with warning of harmful events, such as sudden violent weather changes, avalanches, natural disasters, etc. Further, the present invention provides remotely located vehicles, such as watercraft, with advanced warning of impending harmful events in their locale, such as violent ocean conditions, water spouts, sea state changes, tidal waves, etc.

The present invention is applicable to commercial/non-military, as well as military, applications. Further, the possible events addressed by the system, method and computer program product of present invention range from day-to-day events, such as a street-side performance at a large amusement park, road closing due to construction, etc., to life threatening events, such as the imminent collapse of a building within a disaster area, the imminent detonation of a roadside bomb, etc. The human-computer interface implemented at the user warning and positioning device carried by the individual entities determines the content and amount of information that is relayed to the invention's users, and can be flexibly configured to address a multitude of events and threats.

Those skilled in the art will recognize that the system, user warning and positioning device, and computer program product of the present invention have many applications, and that the present invention is not limited to the representative examples disclosed herein. Although illustrative, the embodiments disclosed herein have a wide range of modification, change and substitution that is intended and in some instances some features of the present invention may be employed without a corresponding use of the other features.

Moreover, the scope of the present invention covers conventionally known variations and modifications to the system components described herein, as would be known by those skilled in the art. Accordingly, it is appropriate that the appended claims be construed broadly and in a manner consistent with the scope of the invention.

What is claimed is:

1. A network event warning system enabling distribution of event warning messages to one or more individual entities within the network event warning system comprising:

(a) one or more situational awareness workstation and threat warning gateways configured to receive event warnings from linked and/or remote sensors, and/or other externally generated event warning messages, the situation awareness workstation and threat warning gateways selected from the group consisting of fixed location gateways and tactical/mobile gateways, each of said gateways comprising:

a wireless communications means configured to receive and transmitting data; and a situational awareness workstation computing means in communication with the wireless communication means;

(b) one or more network bridges in communication with the situational awareness workstation and threat warning gateways, each network bridge defining a local node, said network bridges providing a communications interface between individual user warning and positioning devices and the situational awareness workstation and threat warning gateways, each of said network bridges comprising:

(i) a network bridge wireless communications means configured to receive from and transmitting data to individual user warning and positioning devices, sensors, and command and control systems; and (ii) network bridge computer processing means in communication with the network bridge and network wireless communications means;

(c) one or more user warning and positioning devices, each user warning and position device defining an individual node, each of said user warning and positioning devices comprising:

(i) a power supply (ii) a warning and positioning device computer processing means in communication with the power supply;

(iii) a global positioning system (GPS) receiver means configured to calculate the location of the user warning and positioning device, said GPS receiver means in communication with the power supply and the warning and positioning device computer processing means;

(iv) a wireless communications means in communication with the power supply, warning and positioning device computer processing means, and GPS receiver means; and (v) one or more sensory notification means in communication with the power supply and the warning and positioning device computer processing means;

(d) network situational awareness workstation application program code embodied on a non-transitory computer readable medium for execution on the situational awareness workstation and threat warning gateway computer processing means configured to authenticate event warning messages, processing and analyzing the event warning messages via an event prediction determination process, to produce predicted future event warning messages, and distributing future event warning messages to the network bridges comprising:

(i) application program code operable to decode and authenticate a valid event warning message, input directly or indirectly into one or more of the situational awareness workstation and threat warning gateways, by verifying a digital signature of the event warning message;

(ii) application program code operable to input and authenticate event warning message into an event prediction determination process, thereby analyzing the event warning message to predict a corresponding future event with associated relevant information including predicted event type, location, area impacted, start time, and duration;

(iii) application program code operable to distribute the predicted future event and associated relevant information to one or more network bridges within the event warning network, with or without regard to whether a specific local or individual node will be affected by the predicted future event;

(iv) application program code operable to convert the format of the predicted future event information, in terms of electronic format and content, to alternative electronic formats, before distribution;

(e) bridge application program code embodied on a non-transitory computer readable medium for execution on the network bridge computer processing means for processing event warning messages received from the situational awareness workstation and threat warning gateways, and other external sources, and distributing an authenticated event warning message of an event to occur in the future, said bridge application program code comprising:

(i) application program code operable to automatically verify the authenticity of event warning messages reporting an event to occur in the future, by examining its digital signature, so as to produce either an invalid or valid event warning message;

(ii) application program code operable to input a valid event warning message into an event prediction process, wherein the predicted time of the event is compared with the local time, to determine whether the event will occur at some future time;

(iii) application program code operable to automatically compare a locale to be affected by an authenticated event warning message of an event to occur in the future within the locale of the local node, to determine the affected area;

(iv) application program code operable to send notification to one or more user warning and positioning devices within the affected area of an authenticated event warning message of an event predicted to occur in the future;

(v) application program code operable to relay the event warning message to other local and individual nodes not in the area of the predicted event warning message;

(vi) application program code operable to log off and discard all invalid and elapsed event warning messages;

(vii) application program code operable to input and translate authenticated event warning messages from individual user warning and positioning devices into other message formats utilized by other different command and control systems;

(viii) application program code operable to filter event warning messages that should not be sent from one network to the other;

(ix) application program code operable to track the status of user warning and positioning devices with which the network bridge is in communication with;

(x) application program code operable to enable the network bridges to communicate with sensors, individual user warning and positioning devices, and command and control systems, using different networks and protocols;

(xi) application program code operable to issue keys acting as the root certificate authority for all nodes in the network, thereby permitting the network bridges and user warning and positioning devices to authenticate each other;

(f) user warning and positioning device application program code embodied on a non-transitory computer-readable medium for execution on the user warning device computer processing means in conjunction with the bridge application program code and the situational awareness workstation program code, said user warning device application program code being configured to decode messages, validating and analyzing event warning messages, issuing a notification of an event predicted to occur in the future in the locale of the user warning and positioning device, and relay received messages, said user warning and positioning device application program code comprising:

(i) application program code operable to receive and authenticate event warning messages by verifying the digital signature of the event warning messages;

(ii) application program code operable to decode incoming coded messages;

(iii) application program code operable to query a local cache of relayed messages to determine whether an event warning message has already been relayed;

(iv) application program code operable to relay event warning messages to local and individual nodes concerning an event that has not as yet happened and has not as yet been relayed;

(v) application program code operable to compare the time of the predicted event to the local time, to determine whether the predicted event will occur at some future time and, if it will, authenticate the event warning message;

(vi) application program code operable to log and then discard all invalid or elapsed messages;

(vii) application program code operable to compare the locale to be affected by the predicted future event with the locale of the individual node;

(viii) application program code operable to activate the sensory notification means of the user warning and positioning device when a valid event warning is received, based upon the time remaining until the predicted event; and (ix) application program code operable to periodically transmit messages to local and/or central nodes containing data concerning a unique identifier and location of the user warning and positioning device, and a timestamp of the message.

2. The network event warning system of claim 1, wherein the warning and positioning device computer processing means is a single board computer.

3. The network event warning system of claim 2, wherein the single board computer comprises an advanced power management means to permit conservation of power by putting the single board computer in sleep mode when not in use.

4. The network event warning system of claim 1, wherein the wireless communications means of the user warning and positioning device is a radio frequency transceiver module.

5. The network event warning system of claim 1, wherein the sensory notification means comprises one or more of auditory and vibrating alarms.

6. The network event warning system of claim 1, wherein the GPS receiver means, warning and positioning device computer processing means, and the wireless communication means communicate using universal asynchronous receive/transmit (UART) serial lines.

7. The network event warning system of claim 1, wherein the sensory notification means communicate with the warning and positioning device computer processing means via general purpose input/output (GPIO) lines.

8. A user warning and positioning device
for use in a network event warning system enabling distribution of event warning messages to one or more individual entities within the network event warning information system, the user warning and positioning device comprising:

(i) a power supply;

(ii) a warning and positioning device computer processing means in communication with the power supply;

(iii) a global positioning system (GPS) receiver means configured to calculate the location of the user warning and positioning device, said GPS receiver means in communication with the power supply and the warning and positioning device computer processing means;

(iv) a wireless communications means in communication with the power supply, warning and positioning device computer processing means, and GPS receiver means; and (v) one or more sensory notification means in communication with the power supply and the warning and positioning device computer processing means;

further comprising:

user warning and positioning device application program code embodied on a non-transitory computer-readable medium for execution on the user warning device computer processing means for communication with the network event warning system, said user warning device application program code being configured to decode event warning messages, validating and analyzing event warning messages, issuing a notification of an event predicted to occur in the future in the locale of the user warning and positioning device, and relay received messages, said user warning device application program code comprising:

(i) application program code operable to receive and authenticate event warning messages by verifying a digital signature of the event warning messages;

(ii) application program code operable to decode incoming coded messages;

(iii) application program code operable to query a local cache of relayed messages to determine whether an event warning message has already been relayed;

(iv) application program code operable to relay event warning messages to local and individual nodes concerning an event that has not as yet happened and has not as yet been relayed;

(v) application program code operable to compare the time of the predicted event to the local time, to determine whether the predicted event will occur at some future time and, if it will, authenticate the message;

(vii) application program code operable to log and then discard all invalid or elapsed messages;

(viii) application program code operable to compare the locale to be affected by the predicted future event with the locale of the individual node;
(ix) application program code operable to activate the sensory notification means of the user warning and positioning device when a valid event warning is received, based upon the time remaining until the predicted event; and
(x) application program code operable to periodically transmit messages to local and/or central nodes containing data concerning a digital signature and location of the user warning and positioning device, and a timestamp of the message.

9. A user warning and positioning device
for use by a soldier in a network event warning system enabling distribution of incoming shell event warning messages to one or more soldiers within the network event warning system, the user warning and positioning device comprising:
(i) a power supply;
(ii) a warning and positioning device computer processing means in communication with the power supply;
(iii) a global positioning system (GPS) receiver means configured to calculate the location of the soldier, said GPS receiver means in communication with the power supply and the warning and positioning device computer processing means;
(iv) a wireless communications means in communication with the power supply, warning and positioning device computer processing means, and GPS receiver means; and
(v) one or more sensory notification means in communication with the power supply and the warning and positioning device computer processing means;
further comprising:
user warning and positioning device application program code embodied on a non-transitory computer-readable medium for execution on the soldier's warning device computer processing means for communication with the network event warning system, said user warning device application program code being configured to decode messages, validating and analyzing incoming shell event warning messages, issuing a real-time notification of an incoming shell event predicted to occur in the future in the locale of the soldier's warning and positioning device, and relay received messages, said user warning device application program code comprising:
(i) application program code operable to receive and authenticate incoming shell event warning messages by verifying a digital signature of the event warning messages;
(ii) application program code operable to decode incoming coded messages;
(iii) application program code operable to query a local cache of relayed messages to determine whether an incoming shell event warning message has already been relayed;
(iv) application program code operable to relay incoming shell event warning messages to local and individual nodes concerning an incoming shell event that has not as yet happened and has not as yet been relayed;
(v) application program code operable to compare the time of the predicted incoming shell event to the local time, to determine whether the predicted incoming shell event will occur at some future time and, if it will, authenticate the message;
(vi) application program code operable to log and then discard all invalid or elapsed messages;
(vii) application program code operable to compare the locale to be affected by the predicted future incoming shell event with the locale of the individual node;
(viii) application program code operable to activate the sensory notification means of the soldier's warning and positioning device when a valid incoming shell event warning is received, based upon the time remaining until the predicted incoming shell event; and
(ix) application program code operable to periodically transmit messages to local and/or central nodes containing data concerning a digital signature and location of the soldier's warning and positioning device, and a timestamp of the message.

* * * * *